Dec. 13, 1938.　　　A. K. WEISKITTEL　　　2,139,990
CONSTRUCTION FOR OVENS
Filed Aug. 23, 1937　　　3 Sheets-Sheet 1

Inventor
ANTON K. WEISKITTEL
By Semmes & Semmes
Attorneys

Dec. 13, 1938.　　A. K. WEISKITTEL　　2,139,990
CONSTRUCTION FOR OVENS
Filed Aug. 23, 1937　　3 Sheets-Sheet 2
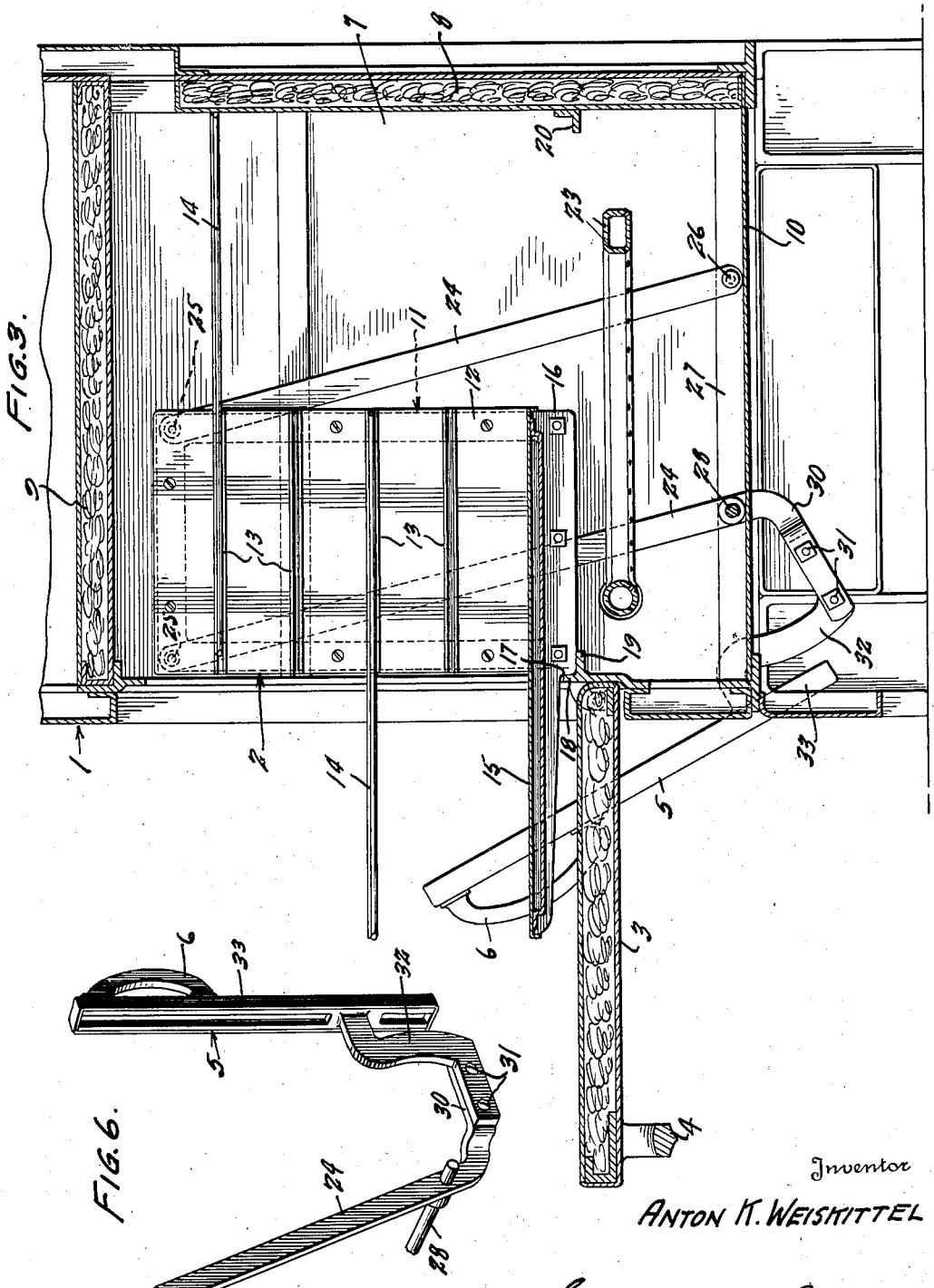
Inventor
ANTON K. WEISKITTEL
By Semmes & Semmes
Attorneys Dec. 13, 1938.     A. K. WEISKITTEL     2,139,990
CONSTRUCTION FOR OVENS
Filed Aug. 23, 1937     3 Sheets-Sheet 3
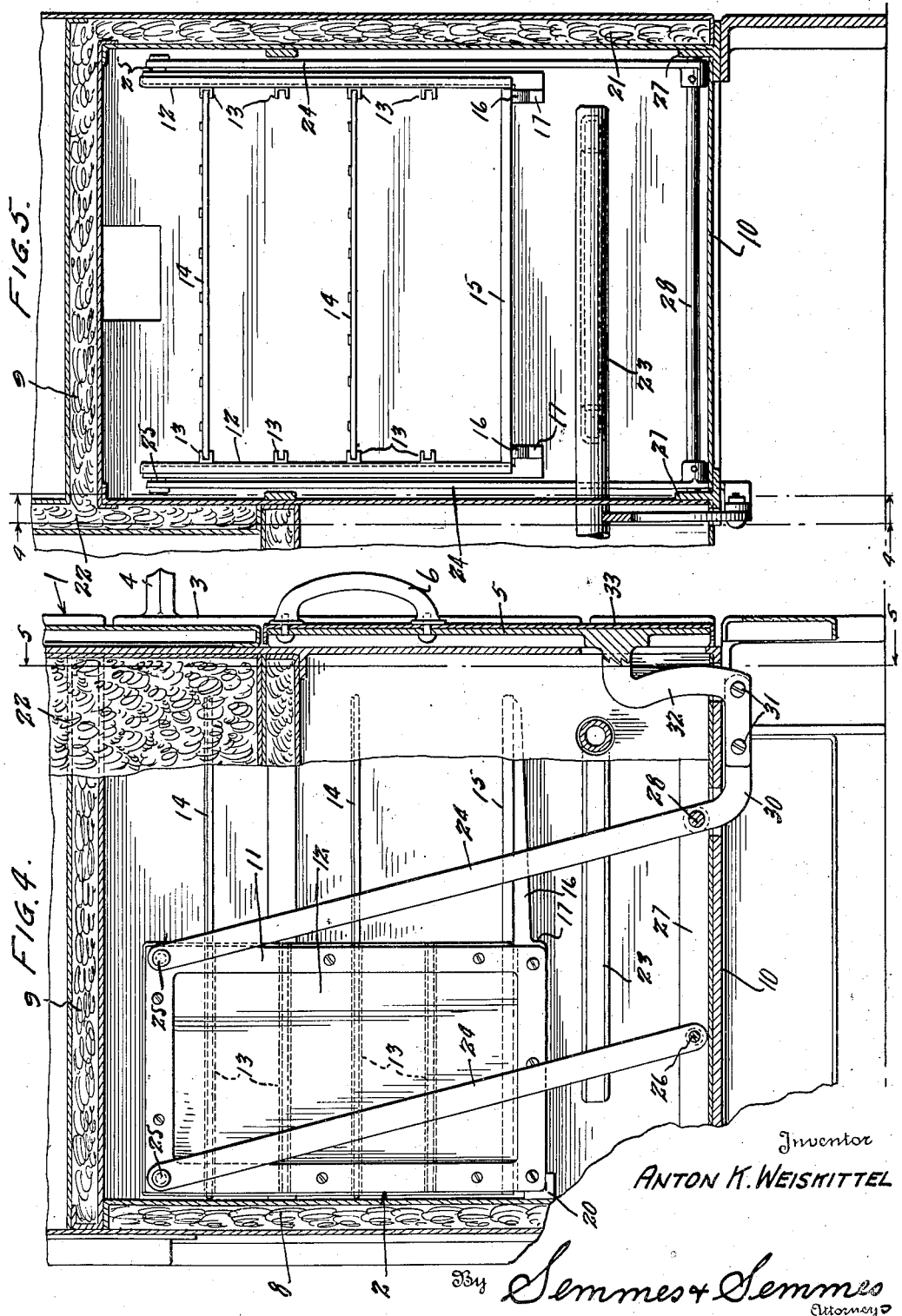
Inventor
ANTON K. WEISKITTEL
By Semmes & Semmes
Attorneys

Patented Dec. 13, 1938

2,139,990

UNITED STATES PATENT OFFICE 2,139,990

CONSTRUCTION FOR OVENS

Anton K. Weiskittel, Baltimore, Md., assignor to Harry C. Weiskittel Co. Inc., Baltimore, Md., a corporation of Maryland Application August 23, 1937, Serial No. 160,547

4 Claims. (Cl. 126—339)

My invention relates to oven constructions, and more particularly to a shelf supporting structure adapted to be swung out into a position where food can be removed readily from the shelves and an inspection made of food being cooked.

An object of my invention is to provide a movable shelf supporting structure which is capable of operation separately from movement of the door.

Another object of my invention is to provide a handle for pivoting the shelf supporting structure of the oven into its forward and back position, which is readily accessible to the user, and which is strong and sturdy.

A further object of my invention is to provide an operating mechanism which is positive, and which will exert sufficient force to readily move a heavily laden oven to the operative position where food can be inspected or removed from the supporting shelves.

Yet a further object of my invention is to provide a construction which has few operating parts, which parts are not subject to deterioration by reason of heat or rust.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Fig. 3 is a view in side elevation of my stove construction with the door open and the pull out structure in the out position, the side of the stove being removed to show the operating parts;

Fig. 4 is a view taken along the line 4—4 of Figure 5, looking in the direction of the arrows;

Fig. 5 is a view taken along the line 5—5 of Figure 4, looking in the direction of the arrows;

Fig. 6 is a detail perspective view of the pivoted operating lever and handle.

Figure 1:
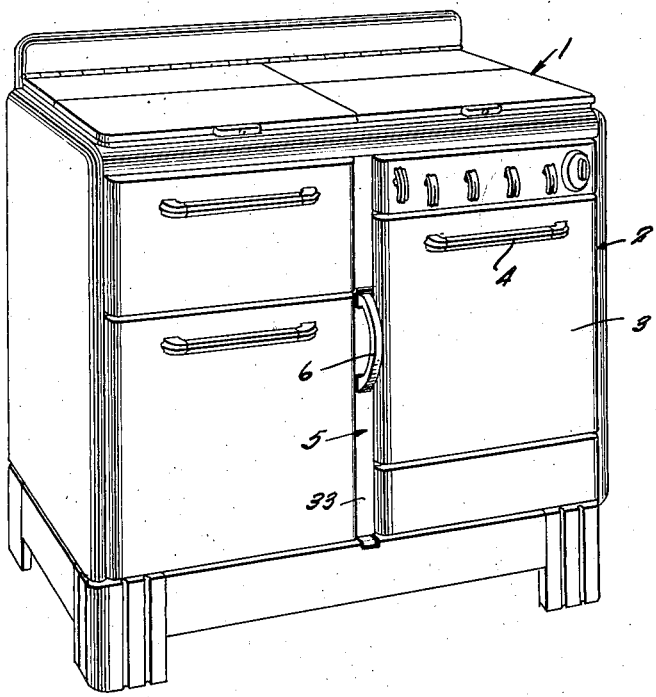
Figure 1 is a perspective view of my stove.

Referring to the drawings, I have shown a stove 1 having a swing out oven shelf construction 2. The oven is provided with a door 3. The front of the door is provided with a handle 4. At the side of the door is provided an operating lever 5 having a handle 6. The door 3 is of the usual insulated construction. The oven proper has an interior 7, an insulated back wall 8, an insulated top 9, and a base 10.

Within the oven is a support 11 comprising two members 12 carrying pairs of grooved tracks 13 in which are adapted to slide support shelves 14.

Attached to the support members 12 is a roasting shelf 15 which is provided at either side with a base member 16. The base members 16 have shoulders 17 formed thereon which are adapted to contact a stop 18 formed on the front of the oven adjacent the bottom of the door opening.

The stop 18 has a shelf 19 formed thereon upon which the bottom of the base member 16 is adapted to rest in the forward position of the shelf support structure (see Figure 3). In the rear position of the shelf support structure each member 12 is adapted to rest against a shelf 20 formed on the rear wall 8 of the oven proper.

The oven is provided with insulated side walls 21 and 22. Underneath the roasting shelf 15 is a burner 23.

There are two pivoted arms provided at each side of the support for the shelves. These arms are designated by the numerals 24. Two of the arms are pivoted at points 25 near the top of the members 12 on one side, and two pivoted at similar points 25 on the other member 12 of the support 11. Each pair of arms 24 is pivoted at a position near the bottom of the oven (see Figures 4 and 5).

The rearmost arms 24 are pivoted on pivots 26 located on supports 27. The supports 27 carry a shaft 28 upon which the pair of forward arms 24 are fastened. The shaft 28 is formed to turn with the forward arms 24 so as to give the construction a certain amount of rigidity to prevent displacement of the pivoting mechanism during operation.

One of the forward arms 24 on the side of the oven nearest the operating lever 5 is provided with a curved downward and forward extension 30 to which is attached by bolts 31 a connecting link 32 which may be integrally formed with the operating lever 5. The operating lever 5 is provided with an extension 33 which covers a trough 34 in which the operating lever 5 is adapted to rest in its normal position (see Figure 1). The extension 33 gives a neat appearance to the operating lever in its normal position. It is to be noted that the operating lever 5 is rigidly attached to the forward front arms 24 of the pivot construction upon which the pull out oven structure is adapted to swing.

Figure 2:
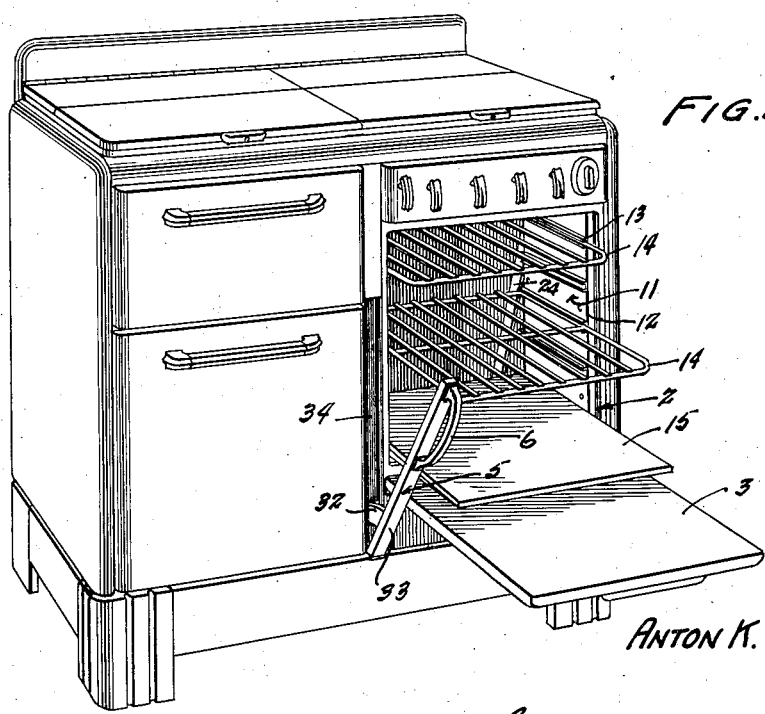
Fig. 2 is a perspective view of my stove with the pull out structure in the forward position, and the door open.

In normal position the parts are as shown in Figure 1 and Figure 4. The operating handle 6 can be grasped after the door 3 has been opened and the movable shelf construction swung into the position illustrated in Figure 2. Here the shelves 14 can be slid backward or forward as desired and food inspected, removed or placed upon the shelves. The operating lever 5 can then be operated by means of the handle 6 to push the entire construction into its back or normal position within the oven (see Figure 4) and the door 3 shut.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A pull out oven construction for a stove comprising a support, shelves carried by the support, a plurality of pivoted parallel arms located on each side of the support enabling the support to be swung forward from its normal back position in the oven, a door, a shaft passing through the lower end of the two front arms and causing them to move together, an operating lever at one side of the door lying flush with the front of the stove in the normal position of the support, and connections to the said two front arms to cause them to pivot with the movement of the operating lever.

2. A pull out oven construction for a stove comprising a support, sliding shelves carried by the support, pivoted arms for the support enabling the support to be swung forward from its normal back position in the oven, a shaft passing through the lower end of the two front arms and causing them to move together, an operating lever adjacent the door lying flush with the front of the stove in the normal position of the support in all positions of the support, rigid connections to the said two front arms to cause them to pivot with the movement of the operating lever, and a handle at the end of the operating lever lying adjacent the door.

3. An oven construction for a stove comprising an oven, a support, shelves carried by the support, a plurality of pivoted parallel arms for the support located on each side of the support enabling the support to be swung forward from its normal back position in the oven, a door, and an operating lever connected by a link mechanism with at least one of said parallel arms to swing the support, said operating lever being separate from the door.

4. An oven construction for a stove comprising an oven, a support, shelves carried by the support, a plurality of pivoted parallel arms for the support located on each side of the support enabling the support to be swung forward from its normal back position in the oven, a door, an operating lever separate from the door, and link mechanism affixed at one end to the lower extremity of the said operating lever and at the opposite end to one of said parallel arms, said operating lever being adapted to swing the support.

ANTON K. WEISKITTEL.